US008687336B2

(12) United States Patent
Wang et al.

(10) Patent No.: US 8,687,336 B2

(45) Date of Patent: Apr. 1, 2014

(54) OVER-CURRENT PROTECTION DEVICE AND BATTERY PROTECTION CIRCUIT ASSEMBLY CONTAINING THE SAME

(75) Inventors: David Shau Chew Wang, Taipei (TW); Fu Hua Chu, Taipei (TW); Chun Teng Tseng, Sanwan Township, Miaoli County (TW)

(73) Assignee: Polytronics Technology Corp., Hsinchu (TW)

( * ) Notice: Subject to any disclaimer, the term of this patent is extended or adjusted under 35 U.S.C. 154(b) by 140 days.

(21) Appl. No.: 13/345,129

(22) Filed: Jan. 6, 2012

(65) Prior Publication Data

US 2013/0176654 A1 Jul. 11, 2013

(51) Int. Cl.
*H02H 5/04* (2006.01)

(52) U.S. Cl.
USPC .......................................... 361/93.7; 361/103

(58) Field of Classification Search
USPC ......................................... 361/106, 93.7, 103
See application file for complete search history.

(56) References Cited

U.S. PATENT DOCUMENTS 7,852,192 B2 * 12/2010 Yu et al. ...................... 338/22 R

* cited by examiner

*Primary Examiner* — Danny Nguyen
(74) *Attorney, Agent, or Firm* — Egbert Law Offices, PLLC

(57) ABSTRACT

An over-current protection device is disposed on a circuit board and configured to protect a battery. The over-current protection device includes a resistive device, at least one insulation layer and a weld electrode layer. The resistive device exhibits positive temperature coefficient behavior. The insulation layer has a thickness of at least 0.03 mm. The weld electrode layer is configured to weld a strip interconnect member to electrically coupled to the battery, and has a thickness of at least 0.03 mm. The insulation layer and the resistive device are disposed between the weld electrode layer and the circuit board. The circuit board, the resistive device and the weld electrode layer are electrically coupled in series. The association of the resistive device and the weld electrode layer has a thermal mass capable of withstanding welding the strip interconnect member without significant damage to the over-current protection device.

15 Claims, 4 Drawing Sheets

OVER-CURRENT PROTECTION DEVICE AND BATTERY PROTECTION CIRCUIT ASSEMBLY CONTAINING THE SAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to an over-current protection device and a battery protection circuit assembly containing the same.

2. Description of Related Art Including Information Disclosed Under 37 CFR 1.97 and 37 CFR 1.98.

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperature, so that the circuit or cell can operate normally. However, when an over-current or an over-temperature event occurs in the circuit or cell, the resistance instantaneously increases to a high resistance state (e.g. at least $10^2\Omega$), so as to suppress over-current and protect the cell or the circuit device.

For battery protection, a known method is to surface-mount an over-current protection device on a circuit board, so as to form a protection circuit module (PCM), which is coupled to positive and negative electrodes of a battery through, for example, strap interconnects to form a protection circuit.

To improve manufacturing efficiency, the over-current protection device is in an attempt to be in connection with the strap interconnects through spot-welding or reflow. However, for spot-welding, the temperature would be somewhere near or above 1500° C., and thus electrical properties of the over-current protection device would be damaged due to high temperature. To prevent damage to the over-current protection device, the impact of high temperature needs to be overcome effectively.

BRIEF SUMMARY OF THE INVENTION

The present application provides an over-current protection device and a battery protection circuit assembly containing the same, with a view to preventing damage to the over-current protection device when it is welded to outer electrodes.

A first aspect of the present application is to disclose an over-current protection device, which is disposed on a circuit board and configured to protect a battery. In an embodiment, the over-current protection device is of a laminated structure, and includes a resistive device, at least one insulation layer and a weld electrode layer. The resistive device exhibits positive temperature coefficient behavior. The insulation layer has a thickness of at least 0.03 mm. The weld electrode layer is configured to weld a strip interconnect member to electrically couple to the battery, and has a thickness of at least 0.03 mm. The insulation layer and the resistive device are disposed between the weld electrode layer and the circuit board. The circuit board, the resistive device and the weld electrode layer are electrically coupled in series. The association of the insulation layer and the weld electrode layer has a thermal mass capable of withstanding welding the strip interconnect member without significant damage to the over-current protection device.

In an embodiment, the resistive device includes a first electrode foil, a second electrode foil and a PTC material layer disposed therebetween. The PTC material layer, the first electrode foil and the second electrode foil extend along a first direction to form a laminated structure. A first insulation layer has a thickness of at least 0.03 mm and is disposed on a surface of the first electrode foil. The weld electrode layer has a thickness of at least 0.03 mm and is disposed on a surface of the first insulation layer. In an embodiment, the over-current protection device further includes a conductive connecting member extends along a second direction substantially perpendicular to the first direction, and electrically connects the weld electrode layer and the first electrode foil. The conductive connecting member is insulated from the second electrode foil. The second electrode foil is configured to electrically coupled to a circuit board, and the first electrode foil is configured to electrically couple to an electrode of a battery by welding the strip interconnect member to the weld electrode layer.

A second aspect of the present application is to disclose a battery protection circuit assembly. In an embodiment, the battery protection circuit assembly includes a circuit board with a plurality of electronic devices disposed thereon. The electronic devices include the aforesaid over-current protection device to avoid over-current in the circuit. The battery protection circuit assembly further includes a battery having a first outer electrode and a second outer electrode. The first outer electrode may include the strip interconnect member that is configured to weld to the weld electrode layer. The strip interconnect member may be of straight shape, crooked shape or L-shape as desired.

BRIEF DESCRIPTION OF THE SEVERAL VIEWS OF THE DRAWINGS

The present application will be described according to the appended drawings in which.

DETAILED DESCRIPTION OF THE INVENTION

Figure 1:
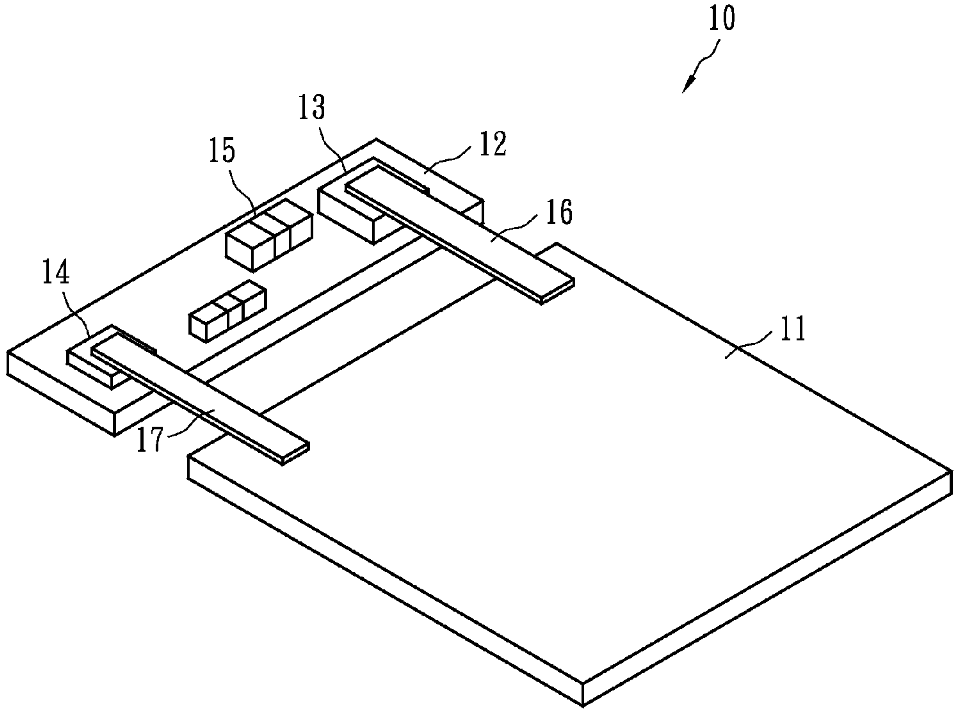
FIG. 1 shows a battery protection circuit assembly in accordance with an embodiment of the present application.

FIG. 1 shows a battery protection circuit assembly in accordance with an embodiment of the present application. The battery protection circuit assembly 10 includes a battery 11 and a circuit board 12. Various electronic devices 15 are placed on the circuit board 12, in which an over-current protection device 13 is provided to form a protection circuit module (PCM). The over-current protection device 13 exhibits positive temperature coefficient behavior and has a surface welded to an end of a strip-form outer electrode 16. Another end of the outer electrode 16 is coupled to the battery 11. The circuit board 12 is provided with a bond pad 14, which is welded to an end of an outer electrode 17, and another end of the outer electrode 17 is coupled to the battery 11. The outer electrodes 16 and 17 are coupled to the positive electrode and negative electrode, or negative electrode and positive electrode of the battery 11, respectively, so as to form a protection circuit.

Figure 2A:
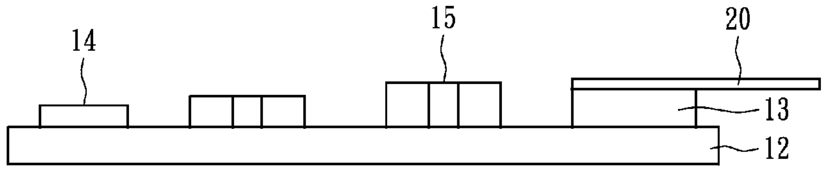
FIG. 2A and FIG. 2B show a protection circuit module (PCM) of the battery protection circuit assembly in accordance with embodiments of the present application.
Figure 2B:
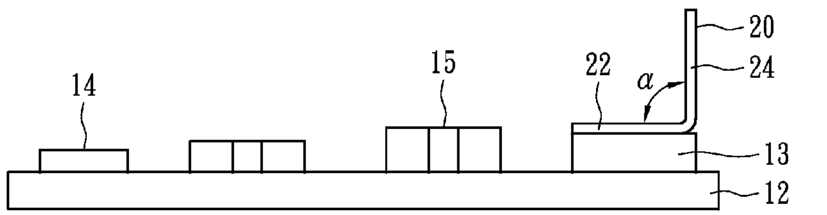

FIG. 2A and FIG. 2B show the battery protection circuit assemblies of the present application. For simplification, FIG. 2A and FIG. 2B only show the essential components of the circuit board 12 serving as a PCM, and the battery is not shown. In FIG. 2A, the circuit board 12 is provided with the over-current protection device 13, electronic devices 15 and the bond pad 14. In consideration of the need of fabrication, the over-current protection device 13 may weld a strip interconnect member 20, so as to connect to a battery electrode. Specifically, the strip interconnect member 20 could be equivalent to the outer electrode 16. In other words, the outer electrode 16 extending from the battery 11 is welded to a surface of the over-current protection device 13. Alternatively, the battery 11 may be provided with an extending connecting member (not shown), and the strip interconnect member 20 has an end welded to the surface of the over-current protection device 13 and another end welded to the extending connecting member of the battery 11. That is, two electrode members form the outer electrode 16 shown in FIG. 1. In summary, the outer electrode 16 includes the strip interconnect member 20 and may be changed in various forms if needed.

The outer electrode 16 of FIG. 1 extends from a side of the circuit board 12. The strip interconnect member 20 in FIG. 2A is straight and extends along the longitudinal direction of the circuit board 12. In an embodiment, the strip interconnect member 20 may be of crooked shape or L-shape as shown in FIG. 2B. For L-shape strip interconnect member 20, it includes a horizontal portion 22 and an uplift portion 24. The horizontal portion 22 is welded to the over-current protection device 13, and the uplift portion 24 and the horizontal portion 22 have an angle $\alpha$ between 60° and 120° or preferably between 75° and 105°. In another embodiment, the strip interconnect member 20 may extend from a side of the circuit board 12, i.e., the direction projecting out of the figure. The extension direction of the strip interconnect member 20 is dependent on the requirements of the connection to the battery.

Figure 3A:
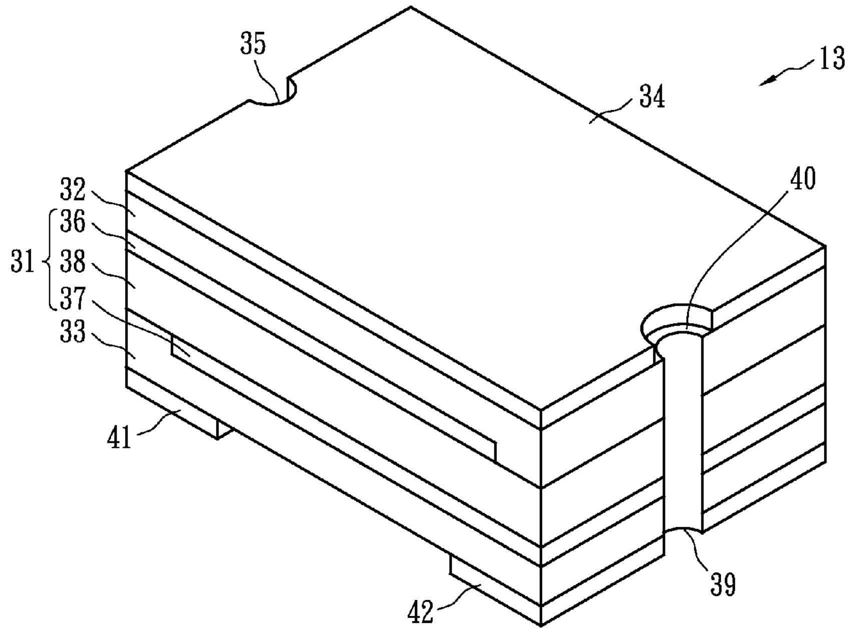
FIG. 3A and FIG. 3B show an over-current protection device in accordance with a first embodiment of the present application.
Figure 3B:
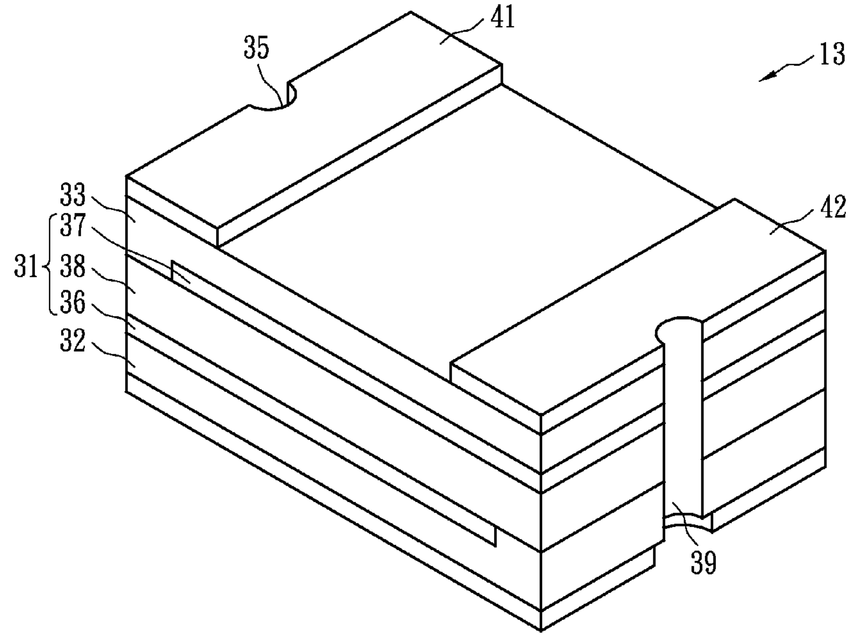

FIG. 3A shows an over-current protection device 13, which is an rectangular surface mountable device and can be disposed on the circuit board 12 as shown in FIG. 1. FIG. 3B is an upside-down view of the device shown in FIG. 3A. The over-current protection device 13 includes a resistive device 31, a first insulation layer 32, a second insulation layer 33, a weld electrode layer 34, conductive connecting members 35 and 39 and bond pads 41 and 42. The resistive device 31 includes a first electrode foil 36, a second electrode foil 37 and a PTC material layer 38 laminated between the first electrode foil 36 and the second electrode foil 37. The PTC material layer 38, the first electrode foil 36 and the second electrode foil 37 extend along a first direction to form a lamination structure. The first insulation layer 32 is formed on a surface of the first electrode foil 36, and has a thickness of at least 0.03 mm, particularly between 0.05 and 1.0 mm, and preferably between 0.1 and 0.3 mm. The weld electrode layer 34 is formed on the first insulation layer 32, and has a thickness of at least 0.03 mm, particularly between 0.05 and 1.0 mm, and preferably between 0.1 and 0.3 mm. In practice, the thickness of the first insulation layer 32 or the weld electrode layer 34 may be 0.06 mm, 0.08 mm, 0.15 mm, 0.2 mm, 0.25 mm. The conductive connecting members 35 and 39 are formed on sides of the device 13, and extend along a second direction substantially perpendicular to the first direction. In an embodiment, the conductive connecting members 35 and 39 may be semi-circular holes plated conductive films or the like. The conductive connecting member 35 electrically connects the weld electrode layer 34 and the first electrode foil 36, and the conductive connecting member 35 is insulated from the second electrode foil 37. The second electrode foil 37 is electrically coupled to the circuit board 12 through the conductive connecting member 39 and the bond pad 42. The weld electrode layer 34 has a circular notch 40 near the conductive connecting member 39, so that the weld electrode layer 34 is insulated from the conductive connecting member 39. The first electrode foil 36 can be electrically coupled to an electrode of a battery 11 by welding the strip interconnect member 20 to the weld electrode layer 34. The bond pad 42 may be surface mounted by reflow on the circuit board 12, and the bond pad 41 is used for being secured on the circuit board 12 only and is not connected to the circuit in the circuit board 12. Accordingly, the bond pad 42 and the weld electrode layer 34 serve as a lower electrode and an upper electrode to be coupled to the circuit board 12 and the strip interconnect member 20, respectively.

Moreover, the first insulation layer 32 of FIG. 3A may be omitted, and the weld electrode layer 34 contacts the first electrode foil 36 directly. Alternatively, the second insulation layer 33 and bond pads 41 and 42 may be omitted, and the second electrode foil 37 is surface-mounted on the circuit board 12 directly. In summary, at least one of the insulation layers 32 and 33 and the resistive device 31 are laminated between the weld electrode layer 34 and the circuit board 12, and the circuit board 12, resistive device 31 and the weld electrode layer 34 are connected in series.

Figure 4:
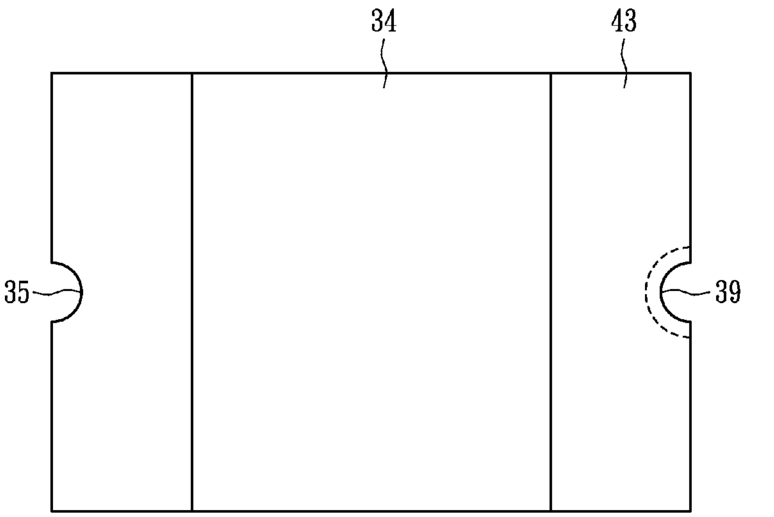
FIG. 4 shows a weld electrode layer of the over-current protection device in accordance with an embodiment of the present application.

Referring to FIG. 4, two ends of the weld electrode layer 34 may be covered by solder masks 43, and the bond pads 41 and 42 of FIGS. 3A and 3B may be replaced with the weld electrode layer 34 with solder masks 43 as an interface for surface-mounting on the circuit board 12. In such case, the weld electrode layer 34 serving as a surface-mounting interface has to have a notch near the conductive connecting member 35 for insulation. Accordingly, the upper and lower surfaces of the device 13 are of symmetrical solder mask design as shown in FIG. 4. Therefore, the orientation of the device 13 needs not to be considered when the device 13 is combined with the circuit board 12 and the strip interconnect member 20.

The association of the first insulation layer 32 and/or the second insulation layer 33 and the weld electrode layer 34 has to have a thermal mass capable of withstanding the force, temperature, voltage and energy when welding the strip interconnect member 20 without significant damage to the device 13, or particularly to over-current protection 31. Therefore, the thicknesses of the insulation layers 32 and 33 and the weld electrode layer 34 are at least 0.03 mm. Thicker thickness usually provides better resistance, but is not suitable for downsizing requirement. In an embodiment, the device 13 can withstand a welding voltage of 1V-5V, particularly 1.3V-4V, and preferably 1.6V-3V. The welding may include spot-welding, reflow, resistance welding, or laser welding. The insulation layers 32 and 33 may include polypropylene, glass fiber or heat dissipation material. The heat dissipation material includes polymer having thermosetting resin and fiber, and polymer having thermoplastic and thermosetting resin interpenetrating network. One example of the polymer having thermoplastic and thermosetting resin interpenetrating network is described in U.S. Pat. No. 8,003,216, and this disclosure is expressly incorporated herein by reference. In an embodiment, the weld electrode layer 34 includes copper foil, nickel foil, nickel-plated copper foil, tin-plated copper foil or nickel-plated stainless.

Figure 5:
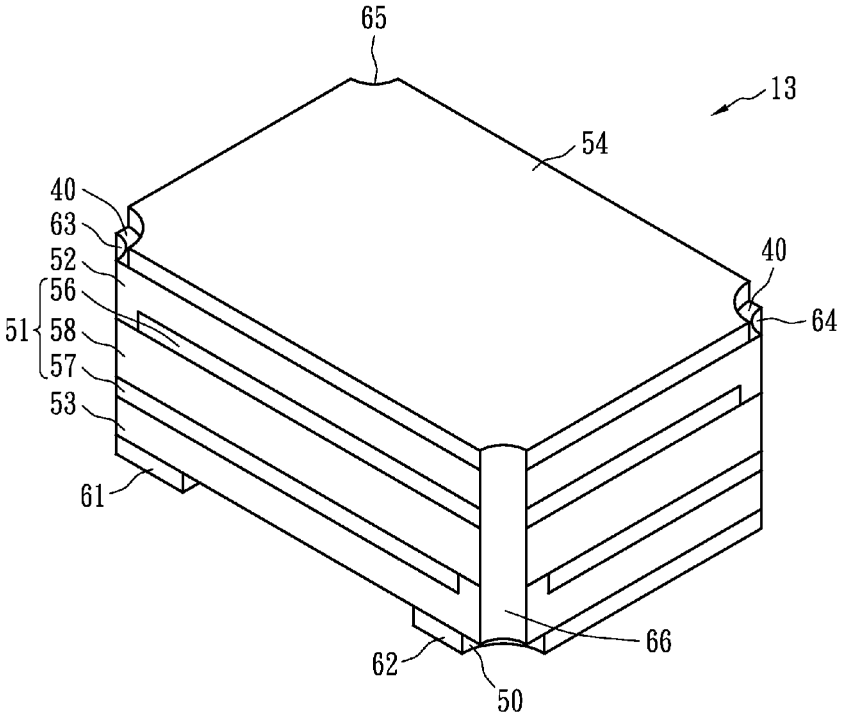
FIG. 5 shows an over-current protection device in accordance with a second embodiment of the present application.

FIG. 5 shows the over-current protection device 13 in accordance with another embodiment of the present application. The device 13 may be placed on the circuit board 12 as shown in FIG. 1 and is a rectangular surface mountable device. The difference of the devices 13 in FIG. 5 and FIGS. 3A and 3B is that the conductive connecting member is formed at corners of the rectangular device. The over-current protection device 13 includes a resistive device 51, a first insulation layer 52, a second insulation layer 53, a weld electrode layer 54, conductive connecting members 63, 64, 65 and 66 and bond pads 61 and 62. The resistive device 51 includes a first electrode foil 56, a second electrode foil 57 and a PTC material layer 58 laminated between the first electrode foil 56 and the second electrode foil 57. The PTC material layer 58, the first electrode foil 56 and the second electrode foil 57 extend along a first direction to form a lamination structure. The first insulation layer 52 is formed on a surface of the first electrode foil 56, and has a thickness of at least 0.03 mm, particularly between 0.05 and 1.0 mm, and preferably between 0.1 and 0.3 mm. The weld electrode layer 54 is formed on the first insulation layer 52, and has a thickness of at least 0.03 mm, particularly between 0.05 and 1.0 mm, and preferably between 0.1 and 0.3 mm. The conductive connecting members 65 and 66 extend along a second direction substantially perpendicular to the first direction, so as to electrically connect the weld electrode layer 54 and the first electrode foil 56, and the conductive connecting members 65 and 66 are insulated from the second electrode foil 57. The second electrode foil 57 is electrically coupled to the circuit board 12 through the conductive connecting members 63 and 64 and the bond pad 61. The weld electrode layer 54 has a circular notch 40 near the conductive connecting members 63 and 64, so that the weld electrode layer 54 is insulated from the conductive connecting members 63 and 64. The first electrode foil 56 can be electrically coupled to an electrode of a battery 11 by welding the strip interconnect member 20 to the weld electrode layer 54. The bond pad 62 is provided with a notch 50 near the conductive connecting member 66 for insulation between them. Likewise, the bond pad 61 near the conductive connecting member 65 forms a notch for insulation. One of the bond pad 61 or 62 may be surface mounted to on the circuit board 12, and the other one is used for being secured to the circuit board 12 only and is not connected to the circuit in the circuit board 12. In this embodiment, the device is symmetrical; therefore the orientation of the device 13 needs not to be considered when welding. Accordingly, the bond pad 61 or 62 and the weld electrode layer 54 serve as a lower electrode and an upper electrode to be coupled to the circuit board 12 and the strip interconnect member 20, respectively.

Likewise, the first insulation layer 52 may be omitted, and the weld electrode layer 54 is in contact with the electrode foil 56. Moreover, the second insulation layer 53 and bond pads 61 and 62 may be omitted, and the electrode foil 57 is surface-mounted on the circuit board 12 by, for example, reflow. Moreover, two ends of the weld electrode layer 54 may be covered with solder masks as mentioned above to provide equivalent function.

The surface mountable over-current protection device 13 may be of other types as described in U.S. Pat. Nos. 6,377,467 and 7,701,322. The disclosures are expressly incorporated herein by reference.

One presently preferred example of a spot-welding apparatus is a model MSW-412 micro spot welder power supply with a dual tip weld head model VB-S+ZH-32 and pressure monitor model SMC G36-10-01 available from SEIWA Manufacturing Co., Ltd. A weld profile using the spot welding apparatus is a square waveform approximately as follows: 1V for 1 ms, 0V for 1.3 ms, and 1.9V for 1.9 ms. The pressure of the dual tip weld head is 0.3 MPa. In this embodiment, the SMD devices are of 2920 and 1812 types, or 2.3 mm×6 mm. The weld electrode layer is tin-plated copper foil, and the insulation layer uses polypropylene. The resistances before and after welding are shown in Table 1.

TABLE 1

| Device Dimension | Thickness of weld electrode layer (mm) | Thickness of Insulation layer (mm) | Resistance before spot-welding (Ω) | Resistance after spot-welding (Ω) | Observations |
|---|---|---|---|---|---|
| 2920 | 0.042 | 0.053 | 0.0864 | 0.0862 | No damage |
| 1812 | 0.042 | 0.053 | 0.0078 | 0.0078 | No damage |
| 2.3 mm × 6 mm | 0.042 | 0.053 | 0.0064 | 0.0067 | No damage |

As shown in Table 1, the resistances before and after spot-welding do not change obviously, and damage to the devices is not observed. Having thus described preferred embodiments of the present application, it will be understood that thermal mass of the association of the insulation layer and the weld electrode layer is sufficient to withstand welding the strip interconnect member without significant damage to the devices.

The above-described embodiments of the present invention are intended to be illustrative only. Numerous alternative embodiments may be devised by persons skilled in the art without departing from the scope of the following claims.

We claim:

1. An over-current protection device having a top surface, a bottom surface and four lateral surfaces interconnecting the top and bottom surfaces, the four lateral surfaces defining four corners in which each of two adjacent lateral surfaces defines a corner therebetween, the over-current protection device comprising:

a resistive device comprising a first electrode foil, a second electrode foil and a PTC material layer laminated therebetween, the PTC material layer, the first electrode layer and the second electrode layer extending along a first direction to form a laminated structure;

a first insulation layer having a thickness of at least 0.03 mm and being disposed on a surface of the first electrode foil;

a weld electrode layer having a thickness of at least 0.03 mm and being disposed on a surface of the first insulation layer; and at least one first conductive connecting member extending along a second direction substantially perpendicular to the first direction and electrically connecting the weld electrode layer and the first electrode foil, the first conductive connecting member being insulated from the second electrode foil, the first conductive connecting member comprising a through hole plated with a conductive film and penetrating through the resistive device and the first insulation layer and ending at an upper surface of the weld electrode layer;

wherein the second electrode foil is configured to electrically coupled to a circuit board, the first electrode foil is configured to electrically couple to an electrode of a battery by a strip interconnect member welded to the weld electrode layer;

wherein the association of the first insulation layer and the weld electrode layer has a thermal mass capable of withstanding welding the strip interconnect member without significant damage to the over-current protection device.

2. The over-current protection device of claim 1, further comprising a second insulation layer and at least one second conductive connecting member, the second insulation layer being disposed on a surface of the second electrode foil, the second conductive connecting member extending along the second direction and electrically connecting the second electrode foil and the circuit board, the second conductive connecting member penetrating through the second insulation layer and the resistive device and the first insulation layer and ending at an upper surface of the first insulation layer.

3. The over-current protection device of claim 2, further comprising a bond pad disposed on a surface of the second insulation layer, the second electrode foil being electrically coupled to the circuit board through the second conductive connecting member and the bond pad.

4. The over-current protection device of claim 2, wherein the first conductive connecting member and the second conductive connecting member are formed on two opposite lateral surfaces of the over-current protection device.

5. The over-current protection device of claim 4, wherein the weld electrode plate has a notch near the second conductive connecting member for insulating from the second conductive connecting member.

6. The over-current protection device of claim 2, wherein the first conductive connecting member is formed on two diagonal ones of the four corners, and the second conductive connecting member is formed on another two diagonal ones of the four corners.

7. The over-current protection device of claim 6, wherein the weld electrode plate has two notches near the second conductive connecting member for insulating from the second conductive connecting member.

8. The over-current protection device of claim 1, wherein the strip interconnect member is of straight shape, crooked shape or L-shape.

9. The over-current protection device of claim 8, wherein the strip interconnect member of L-shape comprises a horizontal portion and an uplift portion, the horizontal portion is welded to the weld electrode layer, and the horizontal portion and the uplift portion form an angle between 60° and 120°.

10. A battery protection circuit assembly; comprising:

a circuit board with a plurality of electronic devices disposed thereon, the electronic devices comprising an over-current protection device, the over-current protection device having a top surface, a bottom surface and four lateral surfaces interconnecting the top and bottom surfaces, the four lateral surfaces defining four corners in which each of two adjacent lateral surface of the four lateral surfaces defines a corner therebetween, the over-current protection device comprising:

a resistive device exhibiting positive temperature coefficient behavior and comprising a first electrode foil and a second electrode foil and a PTC material layer laminated therebetween, the PTC material layer and the first electrode foil and the second electrode foil extending along a first direction to form a laminated structure;

at least one insulation layer having a thickness of at least 0.03 mm and being disposed on a surface of the first electrode foil; and a weld electrode layer having a thickness of at least 0.03 mm and being disposed on a surface of the insulation layer and being configured to weld a strip interconnect member;

at least one first conductive connecting member extending along a second direction substantially perpendicular to the first direction and electrically connecting the weld electrode layer and the first electrode foil, the first conductive connecting member being insulated from the second electrode foil, the first conductive connecting member comprising a through hole plated with conductive film and penetrating through the resistive electrode device, the insulation layer and ending at an upper surface of the weld electrode layer;

wherein the at least one insulation layer and the resistive device are laminated between the weld electrode layer and the circuit board, and the circuit board, the resistive device and the weld electrode layer are electrically coupled in series;

wherein the association of the at least one insulation layer and the weld electrode layer has a thermal mass capable of withstanding welding the strip interconnect member without significant damage to the over-current protection device.

11. The battery protection circuit assembly of claim 10, further comprising a battery having a first outer electrode and a second outer electrode, wherein the first outer electrode comprises the strip interconnect member for welding to weld electrode layer.

12. The battery protection circuit assembly of claim 10, wherein the association of the at least one insulation layer and the weld electrode layer has a thermal mass capable of withstanding spot-welding the strip interconnect member by 1-5V without significant damage to the over-current protection device.

13. The battery protection circuit assembly of claim 11, wherein the second outer electrode is electrically coupled to the circuit board to form a battery protection circuit.

14. The battery protection circuit assembly of claim 10, wherein the strip interconnect member is of straight shape, crooked shape or L-shape.

15. The battery protection circuit assembly of claim 10, wherein the strip interconnect member of L-shape comprises a horizontal portion and an uplift portion, and the horizontal portion is weld to the weld electrode layer, and the horizontal portion and the uplift portion form an angle between 60° and 120°.

* * * * *